Figure 1:
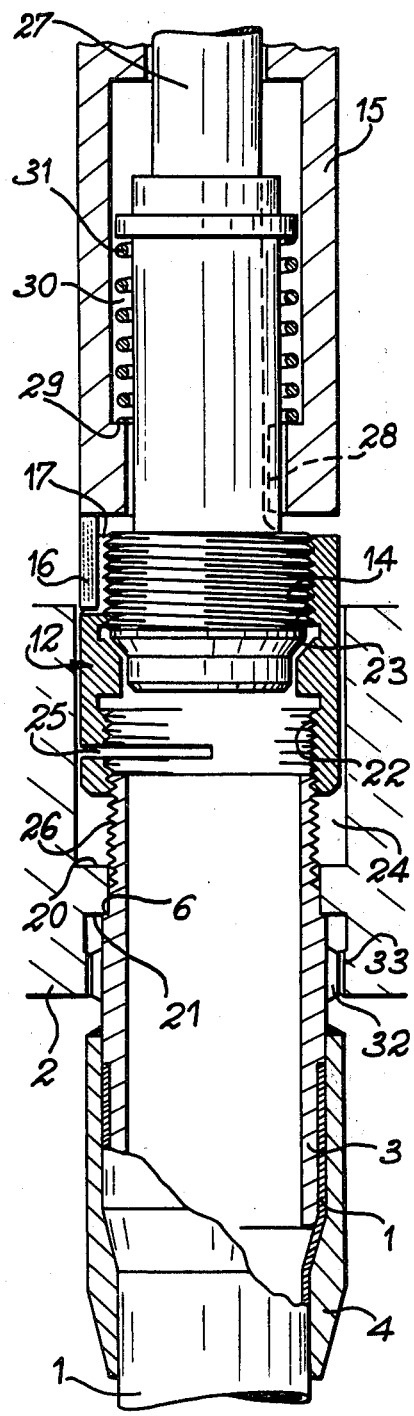

United States Patent [19]

Feutrel

[11] 4,416,848

[45] Nov. 22, 1983

[54] DEVICE FOR FIXING A GUIDE TUBE

[75] Inventor: Claude Feutrel, Vauhallan, France

[73] Assignee: Commissariat a l'Energie Atomique, Paris, France

[21] Appl. No.: 265,601

[22] Filed: May 20, 1981

[30] Foreign Application Priority Data

May 27, 1980 [FR] France ............................... 80 11695

[51] Int. Cl.³ ........................ G21C 19/20; G21C 3/30
[52] U.S. Cl. .................................... 376/260; 376/446
[58] Field of Search ............... 376/260, 442, 271, 292, 376/446; 285/39, 92, 170, 330; 403/197, 200, 201, 238

[56] References Cited

U.S. PATENT DOCUMENTS

| | | | |
|---|---|---|---|
| 3,093,398 | 8/1963 | Fawcett et al. | 376/292 |
| 3,971,575 | 7/1976 | Lesham et al. | 376/446 |
| 4,030,975 | 6/1977 | Anthony et al. | 376/442 |
| 4,219,386 | 8/1980 | Osborne et al. | 376/446 |
| 4,284,475 | 8/1981 | Anthony | 376/446 |
| 4,292,130 | 9/1981 | Viaud et al. | 376/446 |
| 4,366,116 | 12/1982 | Christiansen et al. | 376/446 |

FOREIGN PATENT DOCUMENTS 2493024  4/1982  France ............................... 376/446

Primary Examiner—Sal Cangialosi
Attorney, Agent, or Firm—James E. Nilles

[57] ABSTRACT

Device for fixing a zircaloy guide tube of a fuel assembly of a pressurized ordinary water nuclear reactor to the steel end plate thereof.

This device comprises a ring nut having two threads with opposite pitches, a screwdriver sleeve with teeth, integral in rotation with a pole but mobile in translation by means of an elastic return system along the said pole between a first low position in which the teeth carried by the said screwdriver sleeve are located in recesses in the upper part of the ring nut, which they thereby lock in rotation with the pole and the end fitting and a second upper position in which the teeth are disengaged from the recesses and where the ring and end fitting rotate independently of one another.

Application to fuel assemblies of nuclear reactors of the PWR type.

5 Claims, 4 Drawing Figures

DEVICE FOR FIXING A GUIDE TUBE

The present invention relates to fuel assemblies of nuclear reactors, for example of the type cooled by pressurized ordinary water in which the actual fuel, distributed in the form of a large number of unitary rods, is grouped into autonomous bundles, each constituting a fuel assembly. Such an assembly comprises in per se known manner and diagrammatically, two upper and lower end plates connected to one another by hollow guide tubes, which can be used for introducing control bars or measuring devices. On said guide tubes are generally held spacing grids, which can sometimes freely slide about said guide tubes and in which are fixed, by means of spring systems, the unitary fuel rods.

It is also standard practice for end plates to be made from stainless steel and the guide tubes to be made from a zircaloy alloy, which is permeable to the neutron flux traversing the same.

As it is impossible to weld zircaloy to stainless steel, up to now guide tubes have been fixed to stainless steel end plates mainly by using force fitting systems having undulations serving to prevent the longitudinal sliding of the tube in its support. However, arrangements of this type have a very limited resistance to the differential expansions which occur between the different elements of the connection when the reactor temperature rises. These expansions almost already lead to deformations of a both diametral and longitudinal nature. Finally, at the end of a relatively short operating time, the quality of the joint is impaired.

French Patent EN No. 79 15 272 of June 14th 1979 relates to a method and a device for fixing such a guide tube to the end plate of a nuclear fuel assembly, which provides a durable strong joint by using particularly simple and easily realisable means. This device comprises a sleeve having two outer shoulders, a ferrule force-fitted to the said sleeve, welded to the latter and gripping round the expanded end of the guide tube fitted onto said sleeve up to the first outer shoulder and an orifice in the end plate provided with a shoulder in which is located the said sleeve, whose second shoulder abuts against the shoulder of the upper plate, the upper end of said sleeve being fixed to the upper part of the orifice of the end plate of the assembly.

The device forming the subject matter of French Patent EN No. 79 15272 joins the zircaloy guide tube to the end plate of the stainless steel assembly, whilst preventing any differential expansion between the elements of the joint, both with respect to diametral deformation and longitudinal deformation. This is due to the fact that the different components of the joint abut with one another and welds ensure their final fixing.

The thus produced joint has been completely satisfactory and functions in a very adequate manner. However, its very principle excludes any possibility of disassembly if, during maintenance on a fuel assembly, it is desired to disassemble the upper end plate to replace one or more fuel rods which may have become defective. Moreover, as such an operation is necessarily carried out in a radiation protection pond, i.e. through a sheet of water several meters deep, the technical problems involved in the disassembly of a guide tube are relatively complex and have not hitherto been satisfactorily solved.

Other solutions for joining guide tubes and end plates by screwing have been envisaged (particularly in the manner described in U.S. Pat. No. 4,030,975) but have not been put into use, particularly due to their complexity and the difficulty of remote disassembly.

The present invention specifically relates to a device for fixing such a guide tube in a disassemblable manner to the end plate of an assembly using means which ensure the robustness of the fixture and the complete reliability of the fixing and disassembly operations.

This device for fixing a zircaloy guide tube of a fuel assembly of a nuclear reactor of the pressurized ordinary water type to the steel end plate of said assembly according to claim 2 of the Main Patent is characterized in that it comprises a ring nut having two threads with an opposite pitch, namely first lower thread cooperating with the upper tucked part of the sleeve and ensuring the fixing of the latter in translation by gripping between two shoulders and a second upper thread cooperating with a tapped end fitting mounted at the end of a pole permitting its remote manipulation, a screwdriver sleeve with teeth, integral in rotation with the said pole, but mobile in translation by means of an elastic return system along the said pole between a first low position in which teeth on the screwdriver sleeve are located in recesses in the upper part of the ring which they in this way cause to rotate with the pole and the end fitting and a second high position where the said teeth are disengaged from the aforementioned recesses and where the ring and end fitting are independent in rotation, means for decelerating the rotation of the ring with respect to the sleeve and means for preventing any rotation of the sleeve and the guide tube with respect to the upper end plate during the fixing and disassembly operations.

According to the present invention, the fixing device essentially comprises a ring nut having two threads with opposite pitches. The guide tube is gripped, as in patent EN No. 79 15 272, between an inner sleeve and an outer ferrule. The upper part of the sleeve has a tap onto which is screwed the ring nut and in this way the sleeve is fixed by gripping between two shoulders on the upper end plate when the wing nut is screwed completely down. According to the invention, said ring nut is firstly screwed by its second upper thread to the tapped end fitting of a manipulating pole from the outside above the storage pond for the assembly.

The ring nut is then screwed to the upper tucked part of the sleeve by means of teeth on a screwdriver sleeve which co-rotates with the pole and which is mobile in translation along the latter, said teeth being housed in recesses in the upper part of the ring nut. When this ring nut is completely screwed down, it is merely necessary to disengage the teeth of the screwdriver sleeve from the recesses of the ring nut to ensure that, whilst continuing to rotate the pole in the same direction, the tapped end fitting which it carries is unscrewed from the upper part of the ring nut, because the second upper thread of the latter is oppositely directed compared with the first lower thread.

In order to decelerate the rotation of the ring nut and prevent, for example, that the latter is driven in the opposite direction by the end fitting of the pole it is advantageous according to the present invention to provide means for decelerating its rotation with respect to the sleeve. Various known means can be used for this purpose.

According to a particularly simple embodiment of the invention, said braking means are constituted by a curvilinear half-ring inserted in a deformed manner and limited by a transverse slot made in the first thread of the ring nut.

According to another embodiment, the means for decelerating the rotation of the ring nut with respect to the sleeve comprise an indentation machined on the said ring nut and serving to receive a corresponding deformation of the end plate.

It is also necessary to prevent a rotation of the sleeve with respect to the upper end plate during the fixing and disassembly of the latter.

According to a first embodiment of the invention, the means for preventing the rotation of the sleeve with respect to the upper end plate comprise grooves made on the outer periphery of the sleeve and cooperating with a complementary slot machined in the facing surface of the upper end plate.

According to a second embodiment, these means comprise lugs carried by the surface of a cylindrical mandrel kept immobile in rotation and housed in a central recess of the pole which, for this purpose, is constructed as a hollow cylinder, said lugs cooperating with grooves made on the inner surface of the sleeve.

The invention will be better understood from reading the following description of two embodiments of the device for fixing a guide tube of a fuel assembly to the end plate thereof. This description is provided in an illustrative and a non-limitative manner with reference to the attached FIGS. 1 to 4, wherein show:

FIG. 1 a section along the axis of a guide tube indicating the introduction of the ring nut and the fixing of said guide tube according to a first embodiment of the invention.

Figure 2:
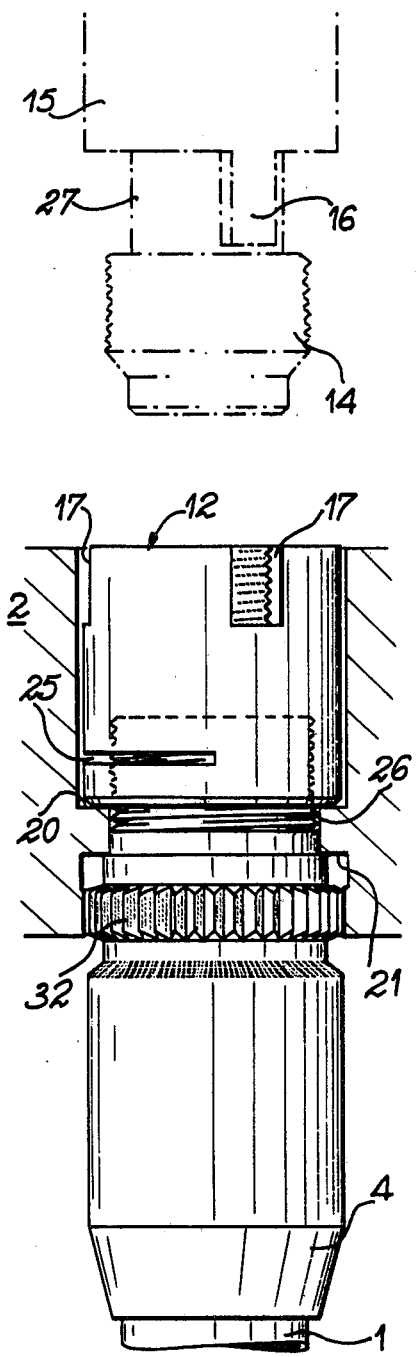

FIG. 2 in the embodiment of FIG. 1 on the one hand the ring nut entirely screwed down and on the other the pole, screwdriver and end fitting disengaged from the end plate of the assembly.

Figure 3:
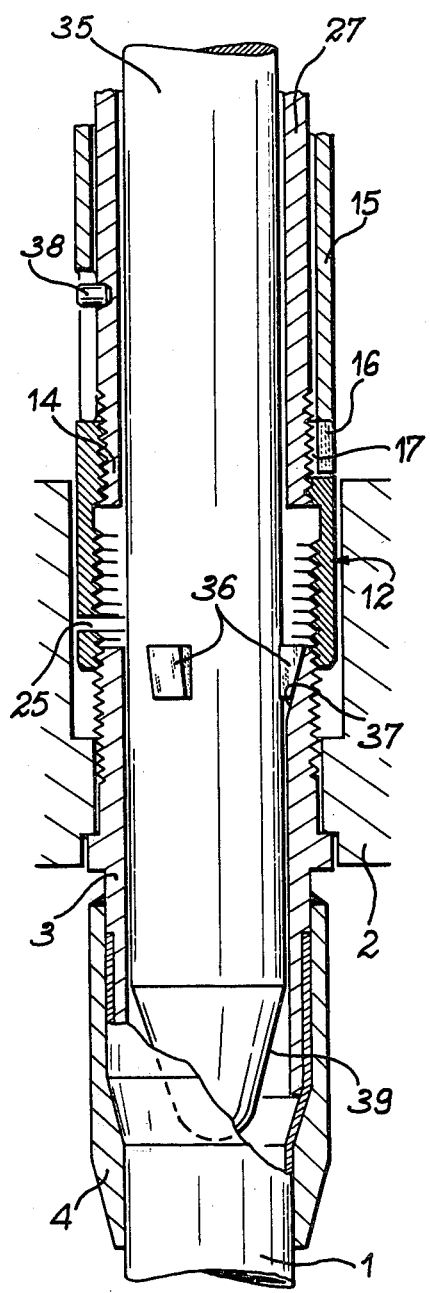

FIG. 3 the operation of fixing a guide tube to the end plate according to a second embodiment of the invention.

Figure 4:
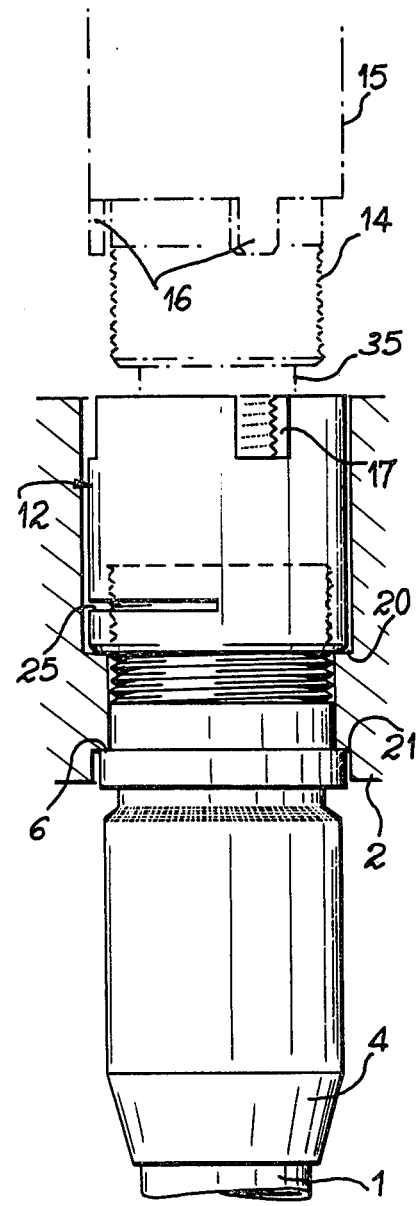

FIG. 4 the device of FIG. 3 in which the ring nut is completely screwed down, it also being possible to see the pole, the screwdriver sleeve and the tapped end fitting in the position where they have been disengaged from the aforementioned assembly after screwing the ring nut.

In all these drawings, it is necessary to imagine, although for reasons of simplification, it is not explicitly shown in the drawings, that the means shown operate in the water of a pond and are manipulated at a distance of several meters solely by means of the pole shown in the upper part of the drawings.

In FIG. 1, it is possible to see the guide tube 1, whose upper part is gripped between a stainless steel ferrule 4 and a stainless steel sleeve 3.

The upper end plate 2 has two shoulders, namely 20 in the upper part and 21 in the lower part, shoulder 21 cooperating with the upper shoulder 6 of sleeve 3.

It is also possible to see in the drawing the ring nut 12 having a first lower thread 22 and a second thread 23, threads 22 and 23 having, according to the invention, opposite pitches. A recess 24 made in the upper part of end plate 2 permits the passage of ring nut 12. The latter also has a curvilinear half-ring which is inserted in deformed manner and limited by a transverse slot 25, which produces a certain friction on the threads of the upper tapped part 26 of sleeve 3 in order to decelerate the rotation of ring nut 12 relative to the said sleeve 3.

The second upper thread 23 of ring nut 12 cooperates with the tapped end fitting 14 fitted to the end of pole 27 by means of which, from the surface of the not shown pond, the complete device is manipulated.

The ring nut 12 also has on its upper periphery, a certain number of recesses 17 cooperating with teeth 16 carried by the base of a screwdriver sleeve 15 positioned around the lower part of pole 27 and movable only in translation along the latter by means of a keyed connection 28, which locks the screwdriver sleeve 15 in rotation with pole 27. In the lower part of pole 27, the screwdriver sleeve 15 has a shoulder 29 defining a recess 30 between the wall of pole 27 and screwdriver sleeve 15 in which is housed a spring 31 which, when the operator on the surface does not exert an antagonising action on the screwdriver sleeve 15 which tends to compress spring 31, makes the teeth 16 enter the recesses 17 of ring nut 12, thereby locking in rotation ring nut 12 and pole 27. In the present embodiment, there are three teeth 16 and three recesses 17 arranged at 120° about the axis of the system.

In the embodiment of FIGS. 1 and 2, sleeve 3 also has a certain number of teeth 32 positioned on the periphery of an annular area of said sleeve 3 and cooperating with a complementary groove 33 in end plate 2. The teeth 32 engage in the hollow parts of the complementary groove 33, thus preventing any rotation of sleeve 3 and consequently of guide tube 1 with respect to end plate 2 during assembly and disassembly of the device. This is necessary as a result of the fact that as the aforementioned operations take place under the action of rotations in one or other direction of ring nut 12, it is indispensible for guide tube 1 to be fixed in rotation with respect to end plate 2.

The device of FIG. 1 then operates in the following way. If, for example, it is desired to fix the guide tube 1 and its sleeve 3 to the upper end plate 2 by means of ring 12, the following procedure is adopted. Outside the protective pond, the operator starts by fixing the ring nut 12 to the end of the pole 27 by screwing the second upper thread 22 to the end fitting 14 of said pole 27. In order to be able to carry out this operation, the operator must firstly raise the screwdriver sleeve 15 upwards in such a way that the teeth 16 free the outer surface of thread 23 of end fitting 14. When this operation has been carried out, the operator frees the screwdriver sleeve 15 and under the action of the expanding spring 31 teeth 16 penetrate the corresponding recesses 17 of the upper part of ring nut 12. The thus prepared arrangement is lowered into the pond and by means of its first lower thread 22 ring nut 12 starts to be screwed along the upper tapped part 26 of sleeve 3. The operator continues to turn the pole 27 in the same direction until ring nut 12 abuts against the upper shoulder 20 of the upper end plate 2. At this time, the operator agains acts on the screwdriver sleeve 15 and compresses the spring in order to free teeth 16 from recesses 17, which disengages the pole 27 and its end fitting 14 from ring 12. As the second upper thread 23 of ring nut 12 has a pitch opposite to that of the first lower thread 22, the operator unscrews end fitting 14 from ring nut 12 by continuing to rotate in the same direction.

In this way, the position of FIG. 2 is attained where the ring nut 12, completely screwed down into its recess holds the guide tube 1 and its sleeve 3 firmly on the two shoulders 20, 21 of end plate 2. Pole 27 and the screwdriver sleeve 15 with teeth 16 are then disengaged and the arrangement, as well as the tapped end fitting 14 can be raised to the surface.

The various manipulations described hereinbefore in connection with the screwing of ring nut 12 to sleeve 3 in recess 24 can be carried out in the opposite order if it is desired to disassemble the arrangement by unscrewing ring nut 12. As the skilled Expert can without difficulty work out this reverse sequence and the following operations necessary for disassembly by means of pole 27 and its tapped end fitting 14, there is no need to give a detailed description of such an operation here.

With reference to FIGS. 3 and 4, a variant of the aforementioned device will now be described which is essentially characterized in that fact that on this occasion sleeve 3 is prevented from rotating not by means of complementary tooth arrangements of sleeve 3 and end plate 2, but by means of a mandrel 35 which is immobilised in rotation from the surface by the operator and which has peripheral lugs 36 located in corresponding grooves 37 made in the inner surface of the upper part of sleeve 3. This mandrel occupies a central position along the axis of guide tube 1 and therefore requires a hollow tubular cylindrical construction for pole 27 within which it moves in translation.

FIG. 3 has the corresponding components to FIGS. 1 and 2 with the same reference numerals and in particular sleeve 15 provided with its keying member 38 for locking sleeve 15 and pole 27 in rotation.

According to the invention, mandrel 35 is introduced and/or removed at the same time as pole 27 and has a centring end fitting 39 facilitating its positioning during the introduction of said pole 27 into the device for an assembly or disassembly operation.

I claim:

1. A device for the disassemblable fixing of a zircaloy guide tube of a fuel assembly of a nuclear reactor of the pressurized ordinary water type to the steel end plate of said assembly by means of a sleeve and an outer ferrule, wherein it comprises a ring nut having two threads with an opposite pitch, namely a first lower thread cooperating with the upper tucked part of the sleeve and ensuring the fixing of the latter in translation by gripping between two shoulders and a second upper thread cooperating with a tapped end fitting mounted at the end of a pole permitting its remote manipulation, a screwdriver sleeve with teeth, integral in rotation with the said pole, but mobile in translation by means of an elastic return system along the said pole between a first low position in which teeth on the screwdriver sleeve are located in recesses in the upper part of the ring which they in this way cause to rotate with the pole and the end fitting and a second high position where the said teeth are disengaged from the aforementioned recesses and where the ring and end fitting are independent in rotation, means for decelerating the rotation of the ring with respect to the sleeve and means for preventing any rotation of the sleeve and the guide tube with respect to the upper end plate during the fixing and disassembly operations.

2. A device according to claim 1, wherein the means for decelerating the rotation of the ring nut with respect to the sleeve are constituted by a curvilinear half-ring inserted in a deformed manner and limited by a transverse slot made in the first thread of the said ring nut.

3. A device according to claim 1, wherein the means for decelerating the rotation of the ring nut with respect to the sleeve are constituted by an indentation machined on the said ring nut and serving to receive a corresponding deformation of the end plate.

4. A device according to claim 1, wherein the means for preventing any rotation of the sleeve relative to the upper end plate comprise grooves made in the outer periphery of the sleeve and cooperate with a complementary recess machined on the facing surface of the upper end plate.

5. A device according to claim 1, wherein the means for preventing any rotation of the sleeve relative to the upper end plate comprise lugs carried by the surface of a cylindrical mandrel, which is kept immobile in rotation and which is housed in the central recess of the pole which, to this end is made in the form of a hollow cylinder, said lugs cooperating with grooves made in the inner surface of the sleeve.

* * * * *